United States Patent
Zheng et al.

(10) Patent No.: US 11,317,322 B2
(45) Date of Patent: Apr. 26, 2022

(54) DATA OFFLOADING METHOD AND GATEWAY

(71) Applicant: Comba Telecom Systems (China) Limited, Guangdong (CN)

(72) Inventors: Ziyong Zheng, Guangdong (CN); Chengxin Hu, Guangdong (CN); Liusheng Zhong, Guangdong (CN); Wenxiang Guan, Guangdong (CN)

(73) Assignee: Comba Network Systems Company Limited, Guangdong (CN)

( * ) Notice: Subject to any disclaimer, the term of this patent is extended or adjusted under 35 U.S.C. 154(b) by 80 days.

(21) Appl. No.: 16/620,679

(22) PCT Filed: Dec. 12, 2017

(86) PCT No.: PCT/CN2017/115714
§ 371 (c)(1),
(2) Date: Dec. 9, 2019

(87) PCT Pub. No.: WO2018/223645
PCT Pub. Date: Dec. 13, 2018

(65) Prior Publication Data
US 2021/0144587 A1 May 13, 2021

(30) Foreign Application Priority Data
Jun. 9, 2017 (CN) .......................... 201710432932.7

(51) Int. Cl.
*H04W 28/08* (2009.01)
*H04W 28/02* (2009.01)

(52) U.S. Cl.
CPC ....... *H04W 28/08* (2013.01); *H04W 28/0247* (2013.01)

(58) Field of Classification Search
CPC .......................... H04W 28/08; H04W 28/0247
See application file for complete search history.

(56) References Cited

U.S. PATENT DOCUMENTS

2014/0160940 A1* 6/2014 Maehara ............... H04W 28/08
370/237
2015/0103772 A1* 4/2015 Carnero Ros ........... H04L 45/04
370/329
(Continued)

FOREIGN PATENT DOCUMENTS

CN 102547861 A 7/2012
CN 102740283 A 10/2012
(Continued)

OTHER PUBLICATIONS

International Search Report and Written Opinion issued by the International Searching Authority (ISA/CN) in PCT Application No. PCT/CN2017/115714 dated Mar. 26, 2018. 8 pages including the English translation of the International Search Report.

*Primary Examiner* — Huy D Vu
*Assistant Examiner* — Bailor C. Hsu
(74) *Attorney, Agent, or Firm* — Meunier Carlin & Curfman LLC

(57) ABSTRACT

An embodiment of the present application relates to the field of communication technologies, and particularly to a data offloading method and a gateway, for achieving data offloading and relieving pressure on a core network. The data offloading method according to the embodiment of the present application is applied to a long term evolution (LTE) system including a base station, a gateway, a core network, and a local server, wherein the base station establishes a link with the core network via the gateway and the base station establishes a link with the local server via the gateway. The method comprises: a gateway receives a first data packet transmitted by a base station, wherein the first data packet comprises first data; and the gateway transmits the first data to a local server upon determining that the first data packet is not a VoLTE data packet in an LTE system, thereby (Continued)

achieving offloading of non-VoLTE data and thus relieving the pressure on a core network.

10 Claims, 6 Drawing Sheets

(56) References Cited

U.S. PATENT DOCUMENTS

| | | | | |
|---|---|---|---|---|
| 2015/0222554 A1* | 8/2015 | Xu | ...................... | H04L 47/2441 |
| | | | | 370/353 |
| 2015/0295833 A1* | 10/2015 | Mizukoshi | ............ | H04L 47/125 |
| | | | | 370/235 |
| 2015/0296499 A1* | 10/2015 | Huang | ................ | H04W 72/048 |
| | | | | 370/329 |
| 2015/0304898 A1* | 10/2015 | Faccin | .................. | H04W 28/08 |
| | | | | 370/235 |
| 2016/0219480 A1* | 7/2016 | Roeland | ................ | H04W 28/12 |
| 2017/0048876 A1* | 2/2017 | Mahindra | ............. | H04M 15/66 |
| 2017/0105142 A1* | 4/2017 | Hecht | ..................... | H04L 67/02 |
| 2017/0208011 A1* | 7/2017 | Bosch | ..................... | H04L 47/25 |

FOREIGN PATENT DOCUMENTS

| | | | |
|---|---|---|---|
| CN | 103763738 | A | 4/2014 |
| CN | 103796246 | A | 5/2014 |
| CN | 103641024 | A | 6/2014 |
| CN | 105050116 | A | 11/2015 |
| CN | 107333295 | A | 11/2017 |
| WO | 2016180459 | A1 | 11/2016 |

* cited by examiner

DATA OFFLOADING METHOD AND GATEWAY

This application is a National Stage of International Application No. PCT/CN2017/115714, filed Dec. 12, 2017, which claims the priority to Chinese Patent Application No. 201710432932.7, filed with Chinese Patent Office on Jun. 9, 2017 and entitled "Data Offloading Method and Gateway", which is incorporated herein by reference in its entirety.

FIELD

Embodiments of this application relate to the technical field of communications, and in particular, to a data offloading method and gateway.

BACKGROUND

With development of the Long Term Evolution (LTE) technology, users are increasingly demanding network services. The number of users increases, and a user data transmission rate increases so that a higher requirement for network elements of a core network is raised. To reduce loads of the core network in an LTE system, a technology for offloading data services in a data transmission process is proposed.

In the related art, a part of data services are directly offloaded from the base station by using a Local Internet Protocol (IP) Access (LIPA) and Selected IP Traffic Offload (SIPTO) method, instead of using the core network. In this method, a local gateway needs to be added to connect to the base station by establishing a direct channel. The local gateway is added to directly offload the data that is generated by accessing a local server, from the base station to the local gateway, without transmitting the data by using the core network. However, in this method, new network elements need to be added in the existing system, and costs are increased. Consequently, it is difficult to implement the method.

Therefore, a data offloading method is urgently needed to implement data offloading and reduce pressure of the core network.

SUMMARY

Embodiments of this application provide a data offloading method and gateway, to implement data offloading and reduce pressure of a core network.

According to a first aspect, an embodiment of this application provides a data offloading method. The method is applicable to an LTE system including a base station, a gateway, a core network, and a local server. A link between the base station and the core network is established by using the gateway, and a link between the base station and the local server is established by using the gateway. The method includes: receiving, by the gateway, a first data packet sent by the base station, wherein the first data packet includes first data; and sending, by the gateway, the first data to the local server when determining that the first data packet is a non-Voice over Long Term Evolution (VoLTE) data packet.

According to a second aspect, an embodiment of this application provides a data offloading gateway. The gateway is applicable to an LTE system including a base station, a gateway, a core network, and a local server. A link between the base station and the core network is established by using the gateway, and a link between the base station and the local server is established by using the gateway. The gateway includes: a receiving unit, configured to receive a first data packet sent by the base station, wherein the first data packet includes a first terminal identifier and first data; a processing unit, configured to determine whether the first data packet is a non-VoLTE data packet; and a sending unit, configured to send the first data to the local server when it is determined that the first data packet is a non-VoLTE data packet.

According to a third aspect, an embodiment of this application provides a gateway, including a transceiver, a processor, a memory, and a communication interface. The transceiver, the processor, the memory, and the communication interface are connected by using a bus. The transceiver is configured to: receive a first data packet sent by the base station, wherein the first data packet includes first data, and send the first data to the local server when it is determined that the first data packet is a non-VoLTE data packet. The processor is configured to: read a program in the memory, and perform the following method: determining whether the first data packet is a non-VoLTE data packet. The memory is configured to store one or more executable programs, and may store data used by the processor when performing an operation.

According to a fourth aspect, an embodiment of this application provides a non-transitory computer readable storage medium. The non-transitory computer readable storage medium stores a computer instruction, and the computer instruction is used for causing a computer to perform the method according to any one of the first aspect or possible implementations of the first aspect.

According to a fifth aspect, an embodiment of this application provides a computer program product. The computer program product includes a computer program stored on a non-transitory computer readable storage medium, the computer program includes a program instruction, and when the program instruction is executed by a computer, the computer is caused to perform the method according to any one of the first aspect or possible implementations of the first aspect.

In the embodiments of this application, in an LTE system including a base station, a gateway, a core network, and a local server, a link between the base station and the core network is established by using the gateway, and a link between the base station and the local server is established by using the gateway. The gateway receives a first data packet sent by the base station, wherein the first data packet includes first data. The gateway sends the first data to the local server when determining that the first data packet is a non-VoLTE data packet. In this way, when the first data packet is a non-VoLTE data packet, the first data in the first data packet is sent to the local server, so that offloading of non-VoLTE data can be implemented, to thereby reduce pressure of the core network.

BRIEF DESCRIPTION OF THE DRAWINGS

To more clearly illustrate technical solutions in the embodiments of this application, the drawings used in the description of the embodiments will be briefly described below.

DETAILED DESCRIPTION OF THE EMBODIMENTS

To make the objectives, technical solutions, and beneficial effects of this application clearer, the following further describes this application in detail with reference to the accompanying drawings and the embodiments. It shall be understood that, the specific embodiments described herein are merely intended for explaining this application, but not for limiting this application.

Figure 1:
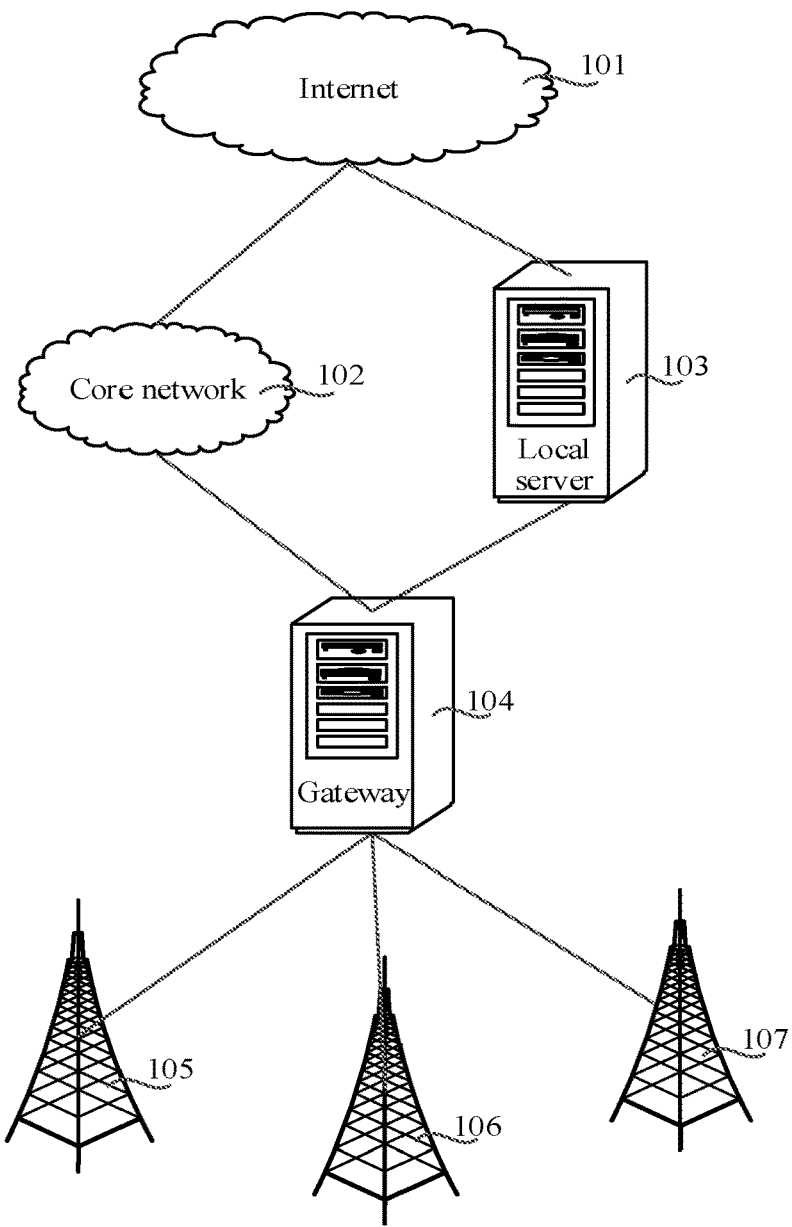
FIG. 1 is a schematic architecture diagram of a data offloading system according to an embodiment of this application.

FIG. 1 exemplarily shows a schematic architecture diagram of a data offloading system applicable to an embodiment of this application. The data offloading system includes a core network, a local server, a gateway, and a base station. A link between the base station and the core network is established by using the gateway, and a link between the base station and the local server is established by using the gateway. The gateway manages a plurality of base stations, and each base station manages a plurality of terminals.

As shown in FIG. 1, the system architecture 100 includes the Internet 101, a core network 102, a local server 103, a gateway 104, a base station 105, a base station 106, and a base station 107. On the one hand, the gateway 104 is separately connected to the base station 105, the base station 106, and the base station 107. On the other hand, the gateway 104 is separately connected to the core network 102 and the local server 103. The core network 102 and the local server 103 are connected to the Internet 101.

In this embodiment of this application, the gateway 104 receives a first data packet sent by the base station, and may send the first data packet to the core network 102 or the local server 103. If the first data packet is a VoLTE data packet, the gateway 104 sends the first data packet to the core network 102. If the first data packet is a non-VoLTE data packet, the gateway 104 sends the first data packet to the local server 103.

In this embodiment of this application, on the one hand, the gateway 104 receives a second data packet sent by the local server 103, and sends the second data packet to the base station, and the base station sends the second data packet to a terminal corresponding to a terminal identifier included in the second data packet. On the other hand, the gateway 104 receives a data packet sent by the core network 102, and sends the data packet to the base station.

In this embodiment of this application, the terminal controls data offloading and link selection of the gateway by installing application software matched with a Hyper Text Transfer Protocol over SecureSocket Layer (HTTPS) service in the local server. The base station is responsible for providing coverage for the terminal and connecting the gateway to the local server. The gateway is responsible for a specific operation of data offloading and controlling of "whether full offloading is enabled". The local server provides an HTTPS service for terminal application software, and message interaction controlling. The local server and the gateway jointly control to "enable or disable full data offloading" for UE. The local server provides a network address translation (NAT) function in addition to direct access to and interaction with the terminal, and provides a NAT networking service for a data message obtained from offloading.

Figure 2:
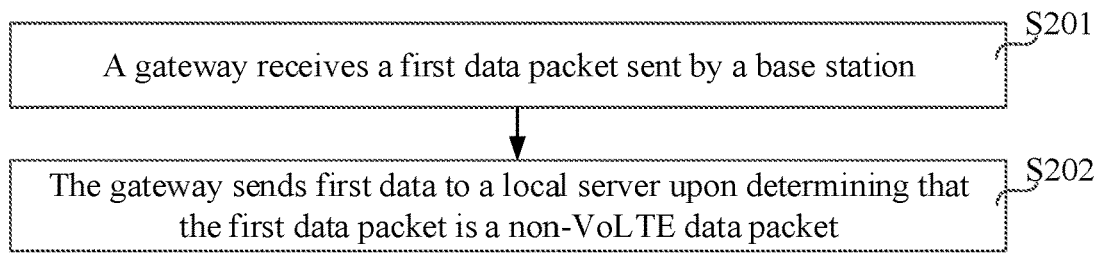
FIG. 2 is a schematic flowchart of a data offloading method according to an embodiment of this application.

FIG. 2 exemplarily shows a schematic flowchart of a data offloading method according to an embodiment of this application.

Based on the system architecture shown in FIG. 1, as shown in FIG. 2, a data offloading method provided by this embodiment of this application is applicable to an LTE system including a base station, a gateway, a core network, and a local server. A link between the base station and the core network is established by using the gateway, and a link between the base station and the local server is established by using the gateway. The method includes the following steps.

Step S201: the gateway receives a first data packet sent by the base station, wherein the first data packet includes first data.

Step S202: the gateway sends the first data to the local server when determining that the first data packet is a non-VoLTE data packet.

In the above embodiment, in step S201, the first data packet is an uplink data packet sent by a terminal to the base station, and the first data included in the first data packet may be VoLTE data, or may be non-VoLTE data.

In the above embodiment, in step S202, there are multiple methods for determining whether the first data packet is a VoLTE data packet. The embodiment of this application provides an optional solution: if a Quality of Service (QoS) class identifier (QCI) of a bearer channel of the received first data packet is any one of values 1, 2, or 5, the first data packet is a VoLTE data packet; or if the QCI is not any one of values 1, 2, or 5, the first data packet is a non-VoLTE data packet.

In the embodiment of this application, the gateway receives the first data packet sent by the base station. The first data packet includes a first terminal identifier and the first data. The gateway sends the first data in the first data packet to the local server when determining that the first data packet is a non-VoLTE data packet. Compared with the related art in which the first data in the first data packet is sent to the core network, the method provided in the embodiment of this application can implement offloading of non-VoLTE data, and reduce pressure of the core network.

Based on step S202 in the above embodiment, that the gateway sends the first data to the local server includes two cases as follows.

In a first case: the gateway sends the first data to the local server when determining that the first data packet is a non-VoLTE data packet. Specifically, the gateway sends the first data to the local server when determining that the first data packet is a non-VoLTE data packet, and the gateway is in a state in which full data local offloading is enabled. In this way, when the gateway is in the state in which full data local offloading is enabled, all received non-VoLTE data packets are forcibly offloaded to the local server. Compared with the method in which offloading is performed on only a part of data streams accessing a VPN server in the related art, this application implements full data local offloading of the non-VoLTE data, that is, the solution provided by the embodiment of this application can implement data offloading more thoroughly than the related art, and can reduce the pressure of the core network.

In a second case: the first data packet further includes a destination IP address, and the gateway sends the first data to the local server when determining that the first data packet is a non-VoLTE data packet. Specifically, the gateway sends the first data to the local server when the gateway determines that the first data packet is a non-VoLTE data packet, and determines that the destination IP address matches an IP address of the local server. In this way, the gateway performs offloading on the non-VoLTE data accessing the local server. For example, if the IP address of the local server is 192.168.26.100, and the destination IP address in the first data packet is 192.168.26.100, the gateway forcibly offloads the first data in the first data packet to the local server. In this way, data packets that need to be processed by the core network are reduced, so that the pressure of the core network is reduced.

In the embodiment of this application, for whether the gateway is in a state in which full data local offloading is enabled, secure communication using an HTTPS encryption manner between the terminal and the local server is adopted to determine whether to enable full data local offloading.

Figure 3:
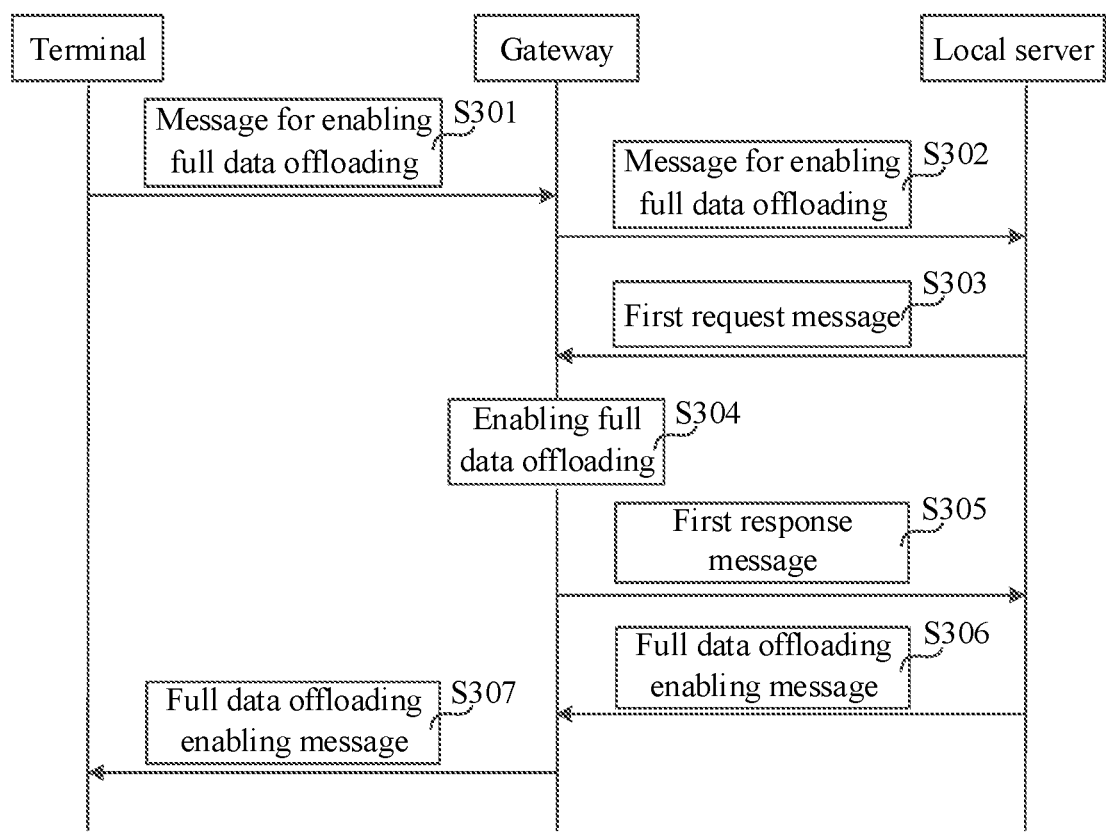
FIG. 3 is a schematic diagram of interaction of enabling full data local offloading between a terminal and a local server according to an embodiment of this application.

To explain more clearly how to enable full data local offloading, FIG. 3 exemplarily shows a schematic diagram of interaction of enabling full data local offloading between a terminal and a local server according to an embodiment of this application. As shown in FIG. 3, steps of enabling full data local offloading are as follows.

Step S301: a terminal sends a message for enabling full data offloading to a gateway.

Step S302: the gateway forwards the message for enabling full data offloading to a local server via Ping.

Step S303: the local server sends a first request message to the gateway, where the first request message may indicate that the local server performs a Ping operation on a certain terminal, and that a size of a message of the Ping operation being 72 bytes is used as a control convention for enabling full data local offloading.

Step S304: if a size of the first message received by the gateway is 72 bytes, the gateway enables full data local offloading.

Step S305: after enabling full data local offloading, the gateway sends a first response message to the local server, where the first response message is a response message for the Ping operation, and if the gateway enables full data local offloading, a size of the first response message sent by the gateway to the local server is 72 bytes.

Step S306: after receiving the first response message, if the size of the first response message is 72 bytes, the local server sends a full data offloading enabling message to the gateway via Https.

Step S307: the gateway sends the full data offloading enabling message to the terminal.

A local area network communication manner is used for the message for enabling full data offloading in the above steps S301 and S302. An HTTPS encryption manner is used for the full data offloading enabling message in steps S306 and S307.

Figure 4:
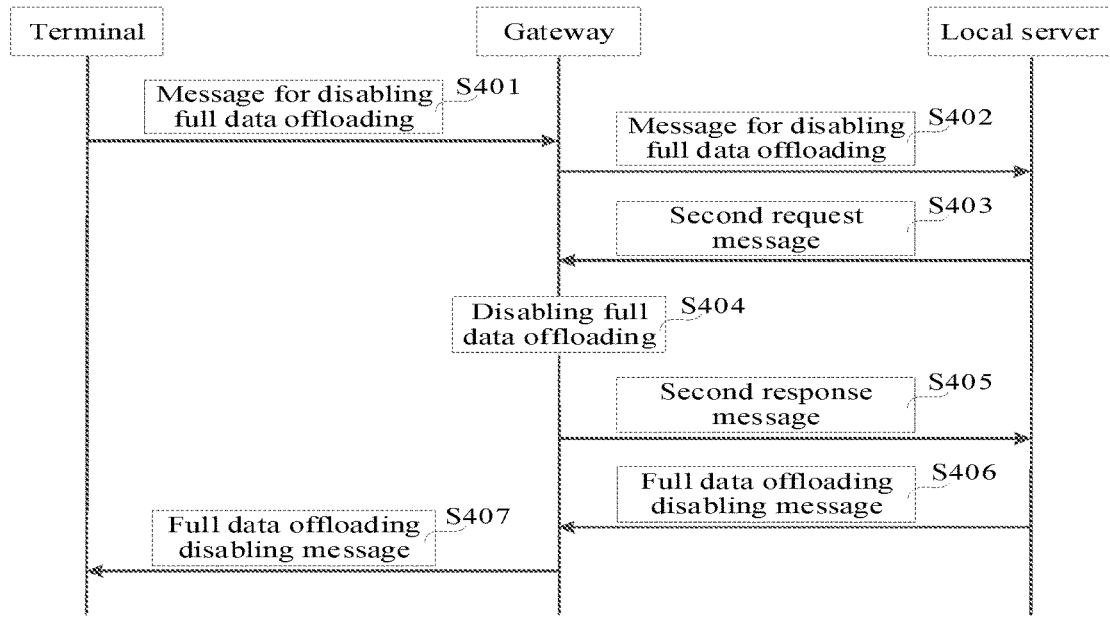
FIG. 4 is a schematic diagram of interaction of disabling full data local offloading between a terminal and a local server according to an embodiment of this application.

To explain more clearly how to disable full data local offloading, FIG. 4 exemplarily shows a schematic diagram of interaction of disabling full data local offloading between a terminal and a local server according to an embodiment of this application. As shown in FIG. 4, steps of disabling full data local offloading are as follows.

Step S401: a terminal sends a message for disabling full data offloading to a gateway.

Step S402: the gateway forwards the message for disabling full data offloading to a local server via Ping.

Step S403: the local server sends a second request message to the gateway, where the second request message may indicate that the local server performs a Ping operation for a certain terminal, and that a size of a message of the Ping operation being 2 bytes is used as a control convention for disabling full data offloading.

Step S404: if a size of the request message received by the gateway is 2 bytes, the gateway disables full data offloading.

Step S405: after disabling full data offloading, the gateway sends a second response message to the local server, where the second response message is a response message for the Ping operation, and if the gateway disables full data local offloading, a size of the second response message sent by the gateway to the local server is 2 bytes.

Step S406: the local server receives the second response message, and if a size of the second response message is 2 bytes, the local server sends a full data offloading disabling message to the gateway via Https.

Step S407: the gateway sends the full data offloading disabling message to the terminal.

A local area network communication manner is used for the message for disabling full data offloading in the above steps S401 and S402, and an HTTPS encryption manner is used for the full data offloading disabling message in steps S406 and S407.

It shall be noted that, in the above embodiments, the gateway and the local server use a local direct communication security manner for offloading control. Once the gateway finds that the local server performs a Ping operation on a certain terminal, the gateway makes a response instead of the terminal, and performs corresponding offloading control. 72 bytes are used as a control convention for enabling full data offloading, and 2 bytes are used as a control convention for disabling full data offloading. A size of a message of the Ping operation is not limited to the following case in which 72 bytes are used as a control convention of enabling full data offloading, and 2 bytes are used as a control convention of disabling full data offloading. For example, 120 bytes may be used as a control convention for enabling full data offloading, and 36 bytes may be used as a control convention for disabling full data offloading.

Optionally, in the embodiments of this application, there are multiple manners of implementing interaction between the terminal and the local server, and one of the manners is as follows: application software is installed on the terminal, and is used for implementing whether to enable full data offloading for the local server. In the embodiments of this application, according to a traditional LTE system, joint control of the gateway, the local server, and the terminal and a flexible offloading control technology of the gateway are depended on, so that it is finally implemented that the client terminal independently selects a traditional LTE networking manner or a local offloading networking manner of the gateway, and control of "whether to enable full data offloading" is internally completed for the gateway and the local server, so that pressure of the core network is reduced, and manners in which operators open capability platforms of the operators are diversified. In this way, a new network transmission support is provided for the operators to broaden the market.

Optionally, after the gateway receives the first data packet sent by the base station, the method further includes: the gateway sends the first data to the core network when determining that the first data packet meets any one of preset conditions. The preset conditions include the following conditions.

Condition 1: the first data packet is a non-VoLTE data packet, the destination IP address does not match the IP address of the local server, and the gateway is in a state in which full data local offloading is disabled.

Condition 2: the first data packet is a VoLTE data packet.

In the above embodiments, if the first data packet is a VoLTE data packet, that is, when the QCI is any one of values 1, 2, and 5, that is, the first data is voice data, regardless of whether the gateway is in a state in which full data local offloading is enabled, the gateway sends the first data to the core network for processing. If the first data packet is a non-VoLTE data packet, the destination IP address does not match the IP address of the local server, and the gateway is in a state in which full data local offloading is disabled, the gateway sends the first data to the core network. In the embodiments of this application, that the gateway sends the first data to the core network includes: the gateway updates an Ethernet header and a tunnel IP header in the first data packet, to obtain a to-be-sent data packet, and sends the to-be-sent data packet to the core network.

Optionally, the first data packet further includes a tunnel IP header, a tunnel User Datagram Protocol (UDP) header, a General Packet Radio Service, GPRS, Tunnel Protocol-User Plane (GTP-U) header, and a first terminal identifier. Before the gateway sends the first data to the local server, the method further includes: the gateway records a corresponding relationship between the tunnel IP header, the tunnel UDP header and the GTP-U header and the first terminal identifier included in the first data packet, and adds the corresponding relationship to a first set. The gateway encapsulates the first data and the first terminal identifier to obtain a first to-be-sent data packet. The gateway sends the first to-be-sent data packet to the local server.

In the embodiments of this application, the first data packet includes an Ethernet header, an IP header, a UDP header, a GTP-U header, a first terminal identifier, and first data. There is a one-to-one correspondence between the IP header, the UDP header, and the GTP-U header and the first terminal identifier. After the gateway receives the first data packet, two cases are as follows.

In a first case: if the gateway determines that the first data packet is a VoLTE data packet, the gateway obtains the first data and the first terminal identifier after decapsulating the VoLTE data packet; and then encapsulates the first data and the first terminal identifier with a new Ethernet header, IP header, UDP header, and GTP-U header, and sends the encapsulated first data and first terminal identifier to the core network.

In a second case: if the gateway determines that the first data packet is a non-VoLTE data packet, the gateway obtains the first terminal identifier and the first data after decapsulating the non-VoLTE data packet, and records a corresponding relationship between the IP header, the UDP header, and the GTP-U header and the first terminal identifier in the first data packet; and encapsulates the first terminal identifier and the first data with a new Ethernet header, and sends the encapsulated first terminal identifier and first data to the local server.

In the embodiments of this application, the gateway receives the first data packet sent by the base station, and records the corresponding relationship between the IP header, the UDP header, the GTP-U header, and the first terminal identifier in the first data packet, so that the gateway determines, when receiving a second data packet sent by the local server, an IP header, a UDP header, and a GTP-U header corresponding to a terminal identifier in the second data packet, and then sends the second data packet to the terminal that performs data interaction with the local server. In this way, downlink data obtained from the Internet is sent to the gateway by using the local server, so that pressure of the core network is reduced.

Optionally, the data offloading method provided by the embodiment of this application further includes: the gateway receives a second data packet sent by the local server. The second data packet includes a to-be-queried terminal identifier and second data. When the gateway determines a terminal identifier in the first set that matches the to-be-queried terminal identifier, the gateway determines a tunnel IP header, a tunnel UDP header, and a GTP-U header corresponding to the terminal identifier that matches the to-be-queried terminal identifier. The gateway encapsulates the second data according to the tunnel IP header, the tunnel UDP header, and the GTP-U header corresponding to the terminal identifier that matches the to-be-queried terminal identifier, to obtain a second to-be-sent data packet. The gateway sends the second to-be-sent data packet to the base station.

In the embodiments of this application, the data included in the second data packet is downlink data, and the to-be-queried terminal identifier is an identifier corresponding to a terminal to which the second data is sent. The gateway receives a plurality of first data packets sent by a plurality of terminals. Therefore, after the gateway receives the second data packet, the gateway needs to, according to the to-be-queried terminal identifier included in the second data packet, send the second data to a corresponding terminal.

For example, the gateway receives two first data packets sent by the base station, namely: a data packet 1 and a terminal identifier $UE_1$; and a data packet 2 and a terminal identifier $UE_2$. A tunnel IP header, a tunnel UDP header, and a GTPU header corresponding to $UE_1$ are respectively $IP_1$, $UDP_1$, and $GTPU_1$. A tunnel IP header, a tunnel UDP header, and a GTPU header corresponding to $UE_2$ are respectively $IP_2$, $UDP_2$, and $GTPU_2$. If the gateway receives a second data packet, and a to-be-queried terminal identifier included in the second data packet is $UE_2$, the gateway encapsulates second data in the second data packet with the tunnel IP header, the tunnel UDP header, and the GTPU header corresponding to the $UE_2$ that are respectively $IP_2$, $UDP_2$, and $GTPU_2$, to obtain a second to-be-sent data packet, sends the second to-be-sent data packet obtained after encapsulation to the base station, and sends the second to-be-sent data obtained after encapsulation to the terminal $UE_2$ by using the base station. In this way, in the embodiments of this application, a part of the downlink data is sent to the gateway by using the local server, so that data traffic passing through the core network is reduced, to thereby reduce pressure of the core network.

Figure 5:
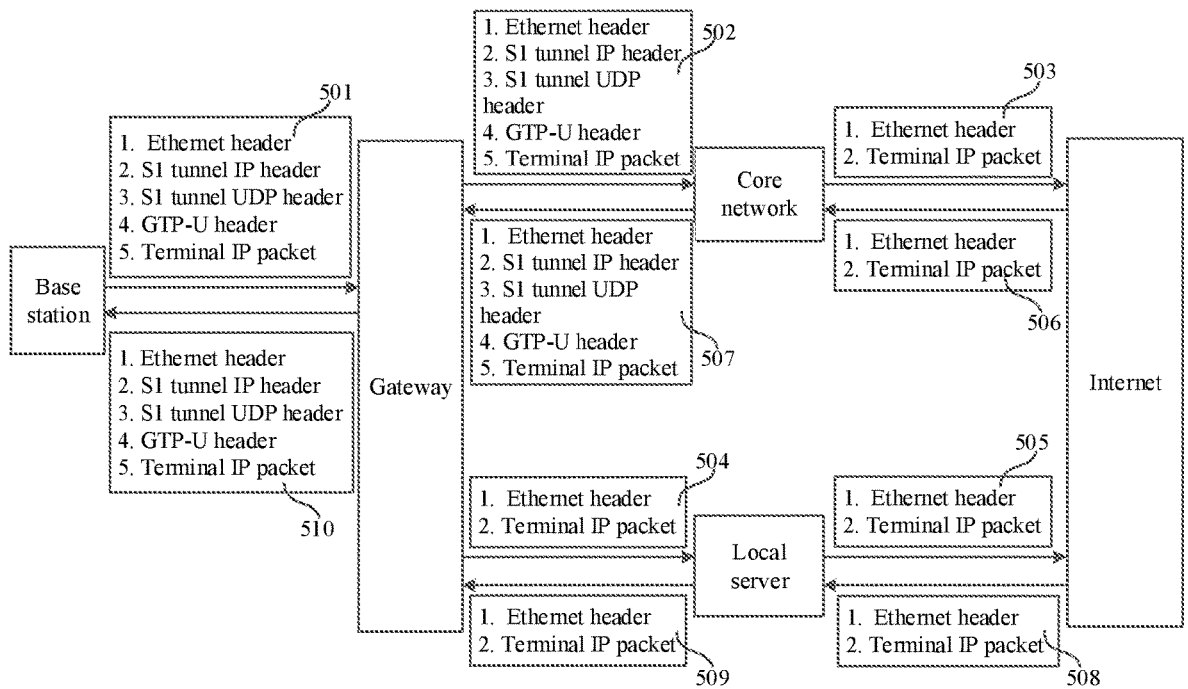
FIG. 5 is a diagram showing an example of an encapsulation format of an uplink/downlink data packet according to an embodiment of this application.

To more clearly describe a format of a data packet between a base station, a gateway, a core network, and a local server, FIG. 5 exemplarily shows an example of an encapsulation format of an uplink/downlink data packet according to an embodiment of this application.

In the embodiments of this application, a data transmission link in an LTE system includes two links: a link 1 includes a base station, a gateway, a core network, and the Internet, and a link 2 includes a base station, a gateway, a local server, and the Internet.

As shown in FIG. 5, uplink data transmission from the base station to the Internet includes the following operations.

(1) The base station sends an uplink data packet 501 to the gateway. An encapsulation format is: an Ethernet header, an S1 tunnel IP header, an S1 tunnel UDP header, a GTP-U header, and a terminal IP packet. The uplink data packet 501 is the first data packet in the foregoing embodiments, and the terminal IP packet includes first data and a first terminal identifier.

(2) After receiving the uplink data packet 501, the gateway determines whether to send the data to the core network or the local server.

If the gateway sends the data to the core network, the gateway updates the Ethernet header and the S1 tunnel IP header in the uplink data packet 501 to obtain an uplink data packet 502, where an encapsulation format of the uplink data packet 502 is: an Ethernet header, an S1 tunnel IP header, an S1 tunnel UDP header, a GTP-U header, and a terminal IP packet; and sends the uplink data packet 502 to the core network.

If the gateway sends the data to the local server, the gateway records a corresponding relationship between the S1 tunnel IP header, the S1 tunnel UDP header, the GTP-U header, and the first terminal identifier in the uplink data packet 501, and adds the corresponding relationship to a first set; removes the S1 tunnel IP header, the S1 tunnel UDP header, and the GTP-U header in the uplink data packet 501; updates the Ethernet header in the uplink data packet 501, to obtain an uplink data packet 504, where an encapsulation format of the uplink data packet 504 is: an Ethernet header and a terminal IP packet; and sends the uplink packet 504 to the local server.

(3) After receiving the uplink data packet 502, the core network removes the S1 tunnel IP header, the S1 tunnel UDP header, and the GTP-U header, and updates the Ethernet header in the uplink data packet 502 to obtain an uplink data packet 503, where an encapsulation format of the uplink data packet 503 is an Ethernet header and a terminal IP packet; and sends the uplink data packet 503 to the Internet.

(4) After receiving the uplink data packet 504, the local server updates the Ethernet header in the uplink data packet 504 to obtain an uplink data packet 505, where an encapsulation format of the uplink data packet 505 is: an Ethernet header and a terminal IP packet; and sends the uplink data packet 505 to the Internet.

Correspondingly, as shown in FIG. 5, downlink data transmission from the Internet to the base station specifically includes the following operations.

(1) The Internet sends a downlink data packet to the core network or the local server. If the Internet sends a downlink data packet 506 to the core network, an encapsulation format of the downlink data packet 506 is: an Ethernet header and a terminal IP packet. If the Internet sends a downlink data packet 508 to the local server, an encapsulation format of the downlink data packet 508 is: an Ethernet header and a terminal IP packet.

(2) The core network receives the downlink data packet 506, adds an S1 tunnel IP header, an S1 tunnel UDP header, and a GTP-U header to the downlink data packet 506, and updates the Ethernet header in the downlink data packet 506, to obtain a downlink data packet 507, where an encapsulation format of the downlink data packet 507 is: an Ethernet header, an S1 tunnel IP header, an S1 tunnel UDP header, a GTP-U header, and an terminal IP packet; and sends the downlink data packet 507 to the gateway.

(3) The local server receives the downlink data packet 508, updates an Ethernet header in the downlink data packet 508, to obtain a downlink data packet 509, where an encapsulation format of the downlink data packet 509 is: an Ethernet header and a terminal IP packet; and sends the downlink data packet 509 to the gateway.

(4) When receiving the downlink data packet 507 sent by the core network, after updating the Ethernet header and the S1 tunnel IP header in the downlink data packet 507, the gateway obtains a downlink data packet 510; when receiving a downlink data packet 509 sent by the local server, the gateway searches, according to a to-be-queried terminal identifier included in a terminal IP packet, the first set for a terminal identifier that matches the to-be-queried terminal identifier, determines an S1 tunnel IP header, an S1 tunnel UDP header, and a GTP-U header corresponding to the terminal identifier that matches the to-be-queried terminal identifier, and encapsulates the terminal IP packet to obtain a downlink data packet 510, where an encapsulation format of the downlink data packet 510 is: an Ethernet header, an S1 tunnel IP header, an S1 tunnel UDP header, a GTP-U header, and a terminal IP packet; and the gateway sends the downlink data packet 510 to the base station.

To introduce the above method flowchart more clearly, an embodiment of this application provides the following example.

Figure 6:
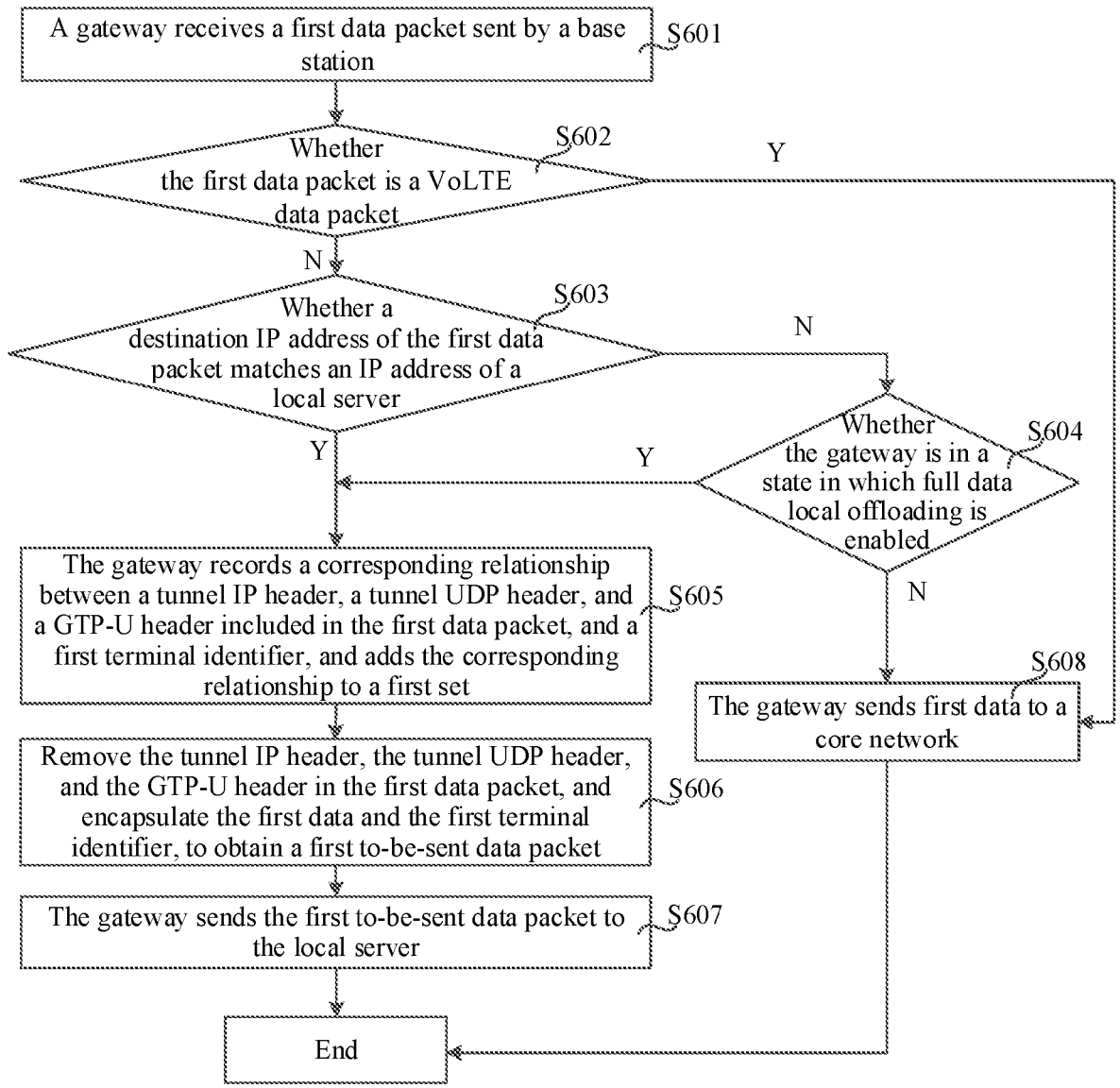
FIG. 6 is a schematic flowchart of an uplink data offloading method according to an embodiment of this application.

FIG. 6 exemplarily shows a schematic flowchart of an uplink data offloading method according to an embodiment of this application. Based on the system architecture shown in FIG. 1, as shown in FIG. 6, another data offloading method provided by the embodiment of this application is applicable to an LTE system including a base station, a gateway, a core network, and a local server. A link between the base station and the core network is established by using the gateway, and a link between the base station and the local server is established by using the gateway. The method includes the following steps.

Step S601: the gateway receives a first data packet sent by the base station, where the first data packet includes a first terminal identifier and first data.

Step S602: the gateway determines whether the first data packet is a VoLTE data packet; and if yes, step S608 is performed; or if not, step S603 is performed.

Step S603: the gateway determines whether a destination IP address in the first data packet matches an IP address of the local server; and if yes, step S605 is performed; or if not, step S604 is performed.

Step S604: whether the gateway is in a state in which full data local offloading is enabled is determined; and if yes, step S605 is performed; or if not, step S608 is performed.

Step S605: the gateway records a corresponding relationship between a tunnel IP header, a tunnel UDP header, and a GTP-U header and a first terminal identifier included in the first data packet, and adds the corresponding relationship to a first set.

Step S606: the gateway removes the tunnel IP header, the tunnel UDP header, and the GTP-U header in the first data packet, and encapsulates the first data and the first terminal identifier to obtain a first to-be-sent data packet.

Step S607: the gateway sends the first to-be-sent data packet to the local server.

Step S608: the gateway sends the first data to the core network.

Figure 7:
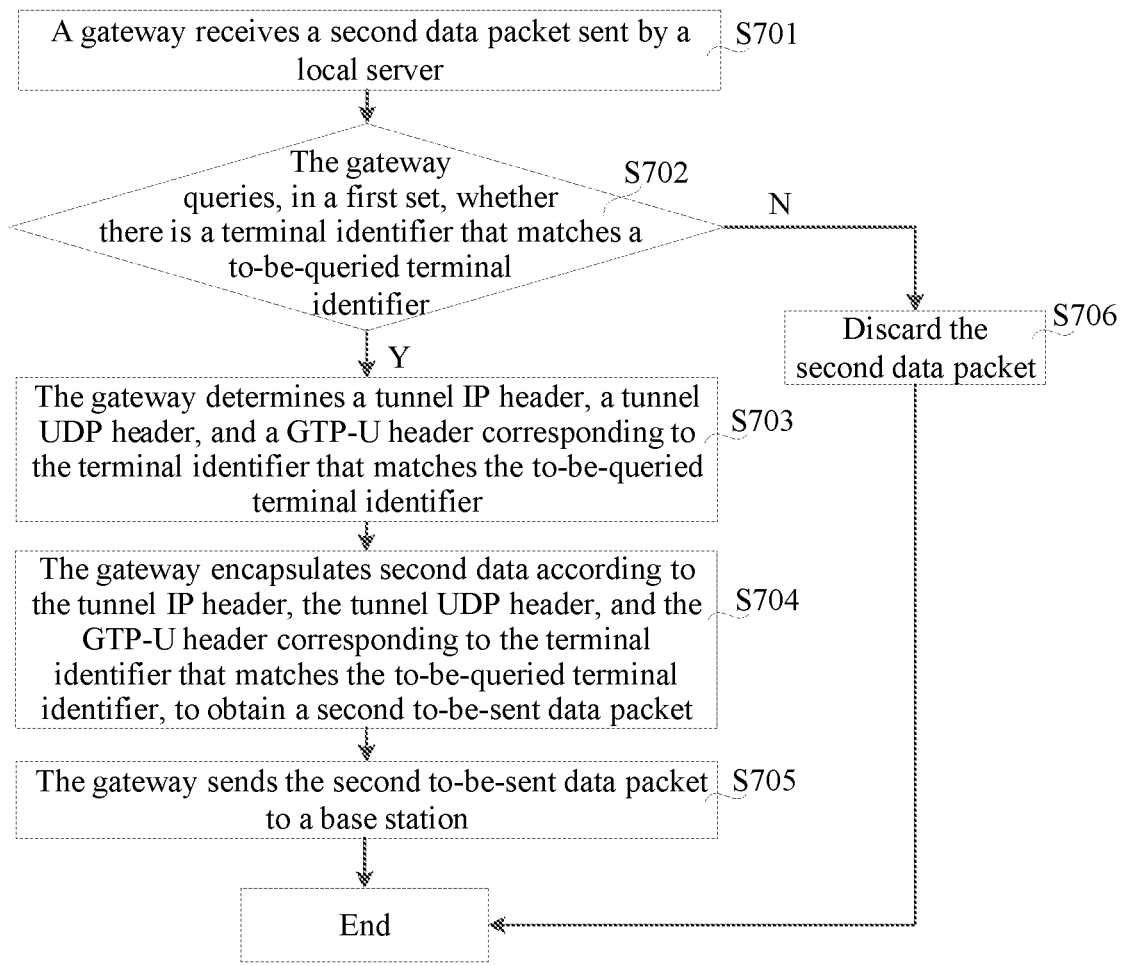
FIG. 7 is a schematic flowchart of a downlink data offloading method according to an embodiment of this application.

FIG. 7 exemplarily shows a schematic flowchart of a downlink data offloading method provided by an embodiment of this application. Based on the system architecture shown in FIG. 1, as shown in FIG. 7, another data offloading method provided by the embodiment of this application is applicable to an LTE system including a base station, a gateway, a core network, and a local server. A link between the base station and the core network is established by using the gateway, and a link between the base station and the local server is established by using the gateway. The method includes the following steps.

Step S701: the gateway receives a second data packet sent by the local server, where the second data packet includes a to-be-queried terminal identifier and second data.

Step S702: the gateway queries whether there is a terminal identifier in a first set that matches the to-be-queried terminal identifier; and if yes, step S703 is performed; or if not, step S706 is performed.

Step S703: a tunnel IP header, a tunnel UDP header, and a GTP-U header corresponding to the terminal identifier that matches the to-be-queried terminal identifier are determined.

Step S704: the gateway encapsulates the second data according to the tunnel IP header, the tunnel UDP header, and the GTP-U header corresponding to the terminal identifier that matches the to-be-queried terminal identifier, to obtain a second to-be-sent data packet.

Step S705: the gateway sends the second to-be-sent data packet to the base station.

Step S706: the second data packet is discarded.

It can be learned from the foregoing method flowcharts of FIG. 6 and FIG. 7 that, when the gateway determines that the first data packet is a non-VoLTE data packet, and when the gateway is in a state in which full data offloading is enabled, the gateway sends the first data to the local server. In this way, offloading of non-VoLTE data in uplink data is implemented, so that pressure of the core network is reduced.

In addition, the gateway receives the second data packet sent by the local server, so that non-VoLTE data in downlink data is sent to the gateway by using the local server instead of the core network, so that data traffic passing through the core network is reduced, and pressure of the core network is reduced.

In the embodiments of this application, a gateway offloading technology and a local server data stream supporting and matching solution are combined, and the gateway, the local server, the terminal are integrated together, and a link through which the terminal accesses the Internet by using the LTE system becomes a terminal controllable manner, so that the pressure of the core network is reduced, a link selection capability on the core network side is opened, and an existing service mode is enriched. The flexible and controllable offloading system and gateway of this application provides a whole new approach for operators to broad the market.

Figure 8:
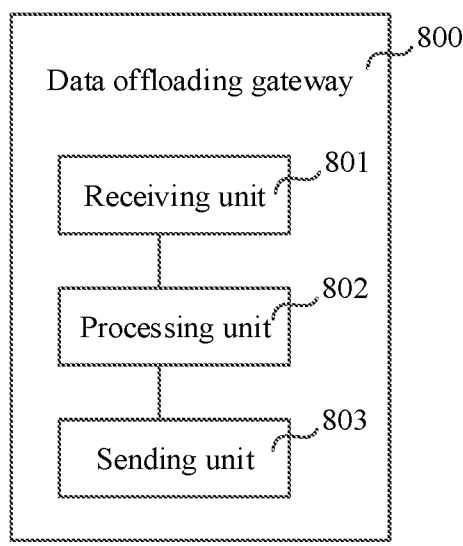
FIG. 8 is a schematic structural diagram of a data offloading gateway according to an embodiment of this application.

FIG. 8 exemplarily shows a schematic structural diagram of a data offloading gateway according to an embodiment of this application.

Based on the same concept, a data offloading gateway provided by an embodiment of this application is applicable to an LTE system including a base station, a gateway, a core network, and a local server. A link between the base station and the core network is established by using the gateway, a link between the base station and the local server is established by using the gateway, and the data offloading gateway is used to perform the foregoing method flowchart. As shown in FIG. 8, the data offloading gateway 800 includes a receiving unit 801, a processing unit 802, and a sending unit 803.

The receiving unit 801 is configured to receive a first data packet sent by the base station. The first data packet includes first data.

The processing unit 802 is configured to determine whether the first data packet is a non-VoLTE data packet.

The sending unit 803 is configured to send the first data to the local server when it is determined that the first data packet is a non-VoLTE data packet.

Optionally, the sending unit 803 is configured to send the first data to the local server when the processing unit 802 determines that the first data packet is a non-VoLTE data packet, and the gateway is in a state in which full data local offloading is enabled.

Optionally, the first data packet further includes a destination IP address. The sending unit 803 is configured to send the first data to the local server when the processing unit 802 determines that the first data packet is a non-VoLTE data packet, and the destination IP address matches an IP address of the local server. The processing unit 802 is further configured to determine whether the first data packet meets any one of preset conditions. The sending unit 803 is further configured to send the first data to the core network when it is determined that the first data packet meets any one of preset conditions. The preset conditions include: the first data packet is a non-VoLTE data packet, and the destination IP address does not match the IP address of the local server, and the gateway is in a state in which full data local offloading is disabled; and the first data packet is a VoLTE data packet.

Optionally, the first data packet further includes a tunnel IP header, a tunnel UDP header, a GTP-U header, and a first terminal identifier. The processing unit 802 is further configured to: record a corresponding relationship between the tunnel IP header, the tunnel UDP header, and the GTP-U header and the first terminal identifier included in the first data packet, and add the corresponding relationship to a first set; and encapsulate the first data and the first terminal identifier to obtain a first to-be-sent data packet. The sending unit 803 is further configured to send the first to-be-sent data packet to the local server.

Optionally, the receiving unit 801 is further configured to receive a second data packet sent by the local server. The second data packet includes a to-be-queried terminal identifier and second data. The processing unit 802 is further configured to: when a terminal identifier in the first set corresponding to the to-be-queried terminal identifier is determined, determine a tunnel IP header, a tunnel UDP header, and a GTP-U header corresponding to the terminal identifier that matches the to-be-queried terminal identifier; and encapsulate the second data according to the tunnel IP header, the tunnel UDP header, and the GTP-U header corresponding to the terminal identifier that matches the to-be-queried terminal identifier, to obtain a second to-be-sent data packet. The sending unit 803 is further configured to send the second to-be-sent data packet to the base station.

It can be learned from the foregoing content that, in the embodiments of this application, the gateway receives the first data packet sent by the base station. The first data packet includes first data. The gateway sends the first data to the local server when determining that the first data packet is a non-VoLTE data packet. In this way, offloading of non-VoLTE data may be implemented, and the pressure of the core network is reduced.

It shall be understood that the unit division above is merely logical function division, and all or some units may be integrated into one physical entity in actual implementation, or may be physically separated.

Figure 9:
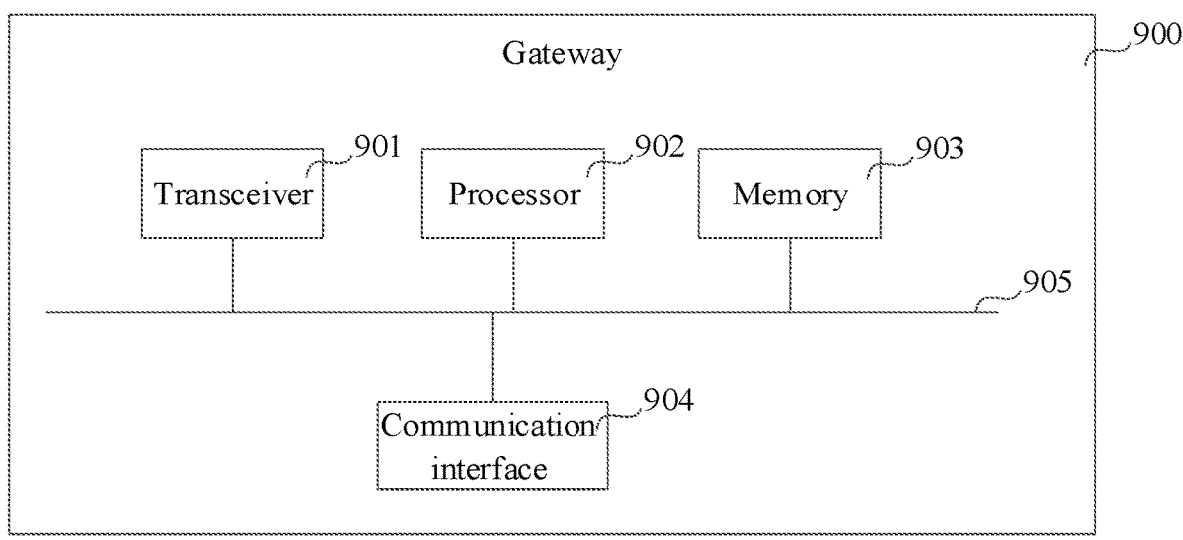
FIG. 9 is a schematic structural diagram of a gateway according to an embodiment of this application.

Based on the same concept, this application provides a gateway applicable to perform the above data offloading method flowchart. FIG. 9 is a schematic structural diagram of a gateway according to this application. The gateway 900 includes a transceiver 901, a processor 902, a memory 903, and a communication interface 904. The transceiver 901, the processor 902, the memory 903, and the communication interface 904 are connected to each other by using a bus 905.

The memory 903 is configured to store one or more programs. Specifically, the program may include a program code, and the program code includes a computer operation instruction. The memory 903 may be a volatile memory, such as a random-access memory (RAM), or may be a non-volatile memory, such as a flash memory, a hard disk drive (HDD) or a solid-state drive (SSD), or may be a combination of any one or more of the above-mentioned volatile memories and non-volatile memories.

The memory 903 stores the following elements, i.e. operation instructions and operating system, an executable module or a data structure, or a subset thereof, or an extended set thereof.

The operation instructions include various operation instructions for implementing various operations.

The operating system includes a variety of system programs for implementing various basic services and handling hardware-based tasks.

The bus 905 may be a peripheral component interconnect (PCI) bus or an extended industry standard architecture (EISA) bus. The bus may be classified into an address bus, a data bus, a control bus, and the like. For ease of representation, only one thick line is shown in FIG. 9, but it does not indicate that there is only one bus or one type of bus.

The communication interface 904 may be a wired communication interface, a wireless communication interface, or a combination thereof. The wired communication interface may be, for example, an Ethernet interface. The Ethernet interface may be an optical interface, an electrical interface, or a combination thereof. The wireless communication interface may be a Wireless Local Area Network (WLAN) interface.

The processor 902 may be a central processing unit (CPU), a network processor (NP) or a combination of a CPU and an NP, and may also be a hardware chip. The hardware chip may be an application-specific integrated circuit (ASIC), a programmable logic device (PLD) or a combination thereof. The PLD may be a complex programmable logic device (CPLD), a field-programmable gate array (FPGA), a general array logic (GAL), or any combination thereof.

The transceiver 901 is configured to receive a first data packet sent by the base station, where the first data packet includes first data, and send the first data to the local server when it is determined that the first data packet is a non-VoLTE data packet. The processor 902 is configured to: read a program in the memory 903, and perform the following method: determining whether the first data packet is a non-VoLTE data packet. The memory 903 is configured to store one or more executable programs, and may store data used by the processor 902 when performing an operation.

In this embodiment of this application, the gateway receives the first data packet sent by the base station, where the first data packet includes first data, and sends the first data to the local server when determining that the first data packet is a non-VoLTE data packet. In this way, offloading of non-VoLTE data can be implemented, and pressure of the core network is reduced.

Optionally, the transceiver 901 is specifically configured to send the first data to the local server when it is determined that the first data packet is a non-VoLTE data packet, and the gateway is in a state in which full data local offloading is enabled.

Optionally, the first data packet further includes a destination IP address. The transceiver 901 is specifically configured to send the first data to the local server when it is determined that the first data packet is a non-VoLTE data packet, and that the destination IP address matches an IP addresses of the local server.

Optionally, the processor 902 is further configured to determine whether the first data packet meets any one of preset conditions. The transceiver 901 is further configured to send the first data to the core network when it is determined that the first data packet meets any one of preset conditions. The preset conditions include: the first data packet is a non-VoLTE data packet, the destination IP address does not match the IP address of the local server, and the gateway is in a state in which full data local offloading is disabled; and the first data packet is a VoLTE data packet.

Optionally, the first data packet further includes a tunnel IP header, a tunnel UDP header, a GTP-U header, and a first terminal identifier. The processor 902 is further configured to: record a corresponding relationship between the tunnel IP header, the tunnel UDP header, and the GTP-U header and the first terminal identifier included in the first data packet, and add the corresponding relationship to a first set; and encapsulate the first data and the first terminal identifier, to obtain a first to-be-sent data packet. The transceiver 901 is further configured to send the first to-be-sent data packet to the local server.

Optionally, the transceiver 901 is further configured to: receive a second data packet sent by the local server, and send a second to-be-sent data packet to the base station. The second data packet includes a to-be-queried terminal identifier and second data. The processor 902 is further configured to: determine, when a terminal identifier in the first set that matches the to-be-queried terminal identifier is determined, a tunnel IP header, a tunnel UDP header, and a GTP-U header corresponding to the terminal identifier that matches the to-be-queried terminal identifier; and encapsulate the second data according to the tunnel IP header, the tunnel UDP header, and the GTP-U header corresponding to the terminal identifier that matches the to-be-queried terminal identifier, to obtain a second to-be-sent data packet.

Persons skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer usable storage media (including but not limited to a magnetic disk memory, a CD-ROM, an optical memory, and the like) that include computer usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that may instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

The invention claimed is:

1. A data offloading method, wherein the method is applicable to a Long Term Evolution (LTE) system comprising a base station, a gateway, a core network, and a local server, the base station is connected to the core network via the gateway, the base station is connected to the local server via the gateway, and the method comprises:
   receiving, by the gateway, a first data packet sent by the base station, wherein the first data packet comprises first data; and
   sending, by the gateway, the first data to the local server upon determining that the first data packet is a non-Voice over Long Term Evolution (VoLTE) data packet;
   wherein the first data packet further comprises a tunnel IP header, a tunnel User Datagram Protocol (UDP) header, a General Packet Radio Service, GPRS, Tunnel Protocol-User Plane (GTP-U) header, and a first terminal identifier; and
   before the sending the first data to the local server, the method further comprises:
   recording, by the gateway, a corresponding relationship between the tunnel IP header, the tunnel UDP header, and the GTP-U header and the first terminal identifier comprised in the first data packet, and adding the corresponding relationship to a first set;
   encapsulating, by the gateway, the first data and the first terminal identifier, to obtain a first to-be-sent data packet; and
   sending, by the gateway, the first to-be-sent data packet to the local server;
   wherein the method further comprises:
   receiving, by the gateway, a second data packet sent by the local server, wherein the second data packet comprises a to-be-queried terminal identifier and second data;
   determining, by the gateway, upon determining a terminal identifier in the first set that matches the to-be-queried terminal identifier, a tunnel IP header, a tunnel UDP header, and a GTP-U header corresponding to the terminal identifier that matches the to-be-queried terminal identifier;
   encapsulating, by the gateway, the second data according to the tunnel IP header, the tunnel UDP header, and the GTP-U header corresponding to the terminal identifier that matches the to-be-queried terminal identifier, to obtain a second to-be-sent data packet and
   sending, by the gateway, the second to-be-sent data packet to the base station.

2. The method according to claim 1, wherein the first data packet further comprises a destination IP address; and
   the sending, by the gateway, the first data to the local server upon determining that the first data packet is a non-VoLTE data packet comprises:
   sending, by the gateway, the first data to the local server upon determining that the first data packet is a non-VoLTE data packet, and the destination IP address matches an IP address of the local server.

3. The method according to claim 2, wherein after the receiving, by the gateway, the first data packet sent by the base station, the method further comprises:
   sending, by the gateway, the first data to the core network upon determining that the first data packet meets any one of preset conditions; wherein
   the preset conditions comprise:
   the first data packet is a non-VoLTE data packet, the destination IP address does not match the IP address of the local server, and the gateway is in a state in which full data local offloading is disabled; and
   the first data packet is a VoLTE data packet.

4. A non-transitory computer readable storage medium, wherein the non-transitory computer readable storage medium stores a computer instruction, and the computer instruction is used for enabling a computer to perform the method according to claim 1.

5. A computer program product, wherein the computer program product comprises a computer program stored in a non-transitory computer readable storage medium, the computer program comprises a program instruction, and when the program instruction is executed by a computer, the computer is enabled to perform the method according to claim 1.

6. The method according to claim 1, wherein the sending, by the gateway, the first data to the local server upon determining that the first data packet is a non-VoLTE data packet comprises:
   sending, by the gateway, the first data to the local server upon determining that the first data packet is a non-VoLTE data packet, and the gateway is in a state in which full data local offloading is enabled.

7. A gateway, comprising: a transceiver, a processor, a memory, and a communication interface, wherein the transceiver, the processor, the memory, and the communication interface are connected via a bus;
   the transceiver is configured to: receive a first data packet sent by a base station, wherein the first data packet comprises first data, and send the first data to a local server upon determining that the first data packet is a non-Voice over Long Term Evolution (VoLTE) data packet;
   the processor is configured to: read a program in the memory and perform the following method: determining whether the first data packet is a non-VoLTE data packet; and the memory is configured to store one or more executable programs, and store data used by the processor when performing an operation;

wherein the first data packet further comprises a tunnel IP header, a tunnel User Datagram Protocol (UDP) header, a General Packet Radio Service, GPRS, Tunnel Protocol-User Plane (GTP-U) header, and a first terminal identifier;

the processor is further configured to:

record a corresponding relationship between the tunnel IP header, the tunnel UDP header, and the GTP-U header and the first terminal identifier comprised in the first data packet, and add the corresponding relationship to a first set; and encapsulate the first data and the first terminal identifier, to obtain a first to-be-sent data packet; and the transceiver is further configured to:

send the first to-be-sent data packet to the local server;

wherein the transceiver is further configured to:

receive a second data packet sent by the local server, and send a second to-be-sent data packet to the base station, wherein the second data packet comprises a to-be-queried terminal identifier and second data; and the processor is further configured to:

determine, upon determining a terminal identifier in the first set that matches the to-be-queried terminal identifier, a tunnel IP header, a tunnel UDP header, and a GTP-U header corresponding to the terminal identifier that matches the to-be-queried terminal identifier; and encapsulate the second data according to the tunnel IP header, the tunnel UDP header, and the GTP-U header corresponding to the terminal identifier that matches the to-be-queried terminal identifier, to obtain the second to-be-sent data packet.

8. The gateway according to claim 7, wherein the first data packet further comprises a destination IP address; and the transceiver is further configured to:

send the first data to the local server upon determining that the first data packet is a non-VoLTE data packet, and determining that the destination IP address matches an IP address of the local server.

9. The gateway according to claim 8, wherein the processor is further configured to determine whether the first data packet meets any one of preset conditions; and the transceiver is further configured to:

send the first data to the core network upon determining that the first data packet meets any one of preset conditions; wherein the preset conditions comprise:

the first data packet is a non-VoLTE data packet, the destination IP address does not match the IP address of the local server, and the gateway is in a state in which full data local offloading is disabled; and the first data packet is a VoLTE data packet.

10. The gateway according to claim 7, wherein the transceiver is further configured to:

send the first data to the local server upon determining that the first data packet is a non-VoLTE data packet, and the gateway is in a state in which full data local offloading is enabled.

* * * * *